Aug. 14, 1923.

S. S. DAVIS 1,465,159

DEMOUNTABLE RIM

Filed June 24, 1921

WITNESSES
Frank B. Cook
Harry E. Seidel

Samuel S. Davis
INVENTOR

BY

ATTORNEY

Aug. 14, 1923.

S. S. DAVIS 1,465,159

DEMOUNTABLE RIM

Filed June 24, 1921

Samuel S. Davis
INVENTOR

WITNESSES

BY

ATTORNEY

Patented Aug. 14, 1923.

1,465,159

UNITED STATES PATENT OFFICE.

SAMUEL S. DAVIS, OF BLOOMFIELD, MISSOURI.

DEMOUNTABLE RIM.

Application filed June 24, 1921. Serial No. 480,125.

*To all whom it may concern:*

Be it known that I, SAMUEL S. DAVIS, a citizen of the United States, residing at Bloomfield, in the county of Stoddard and State of Missouri, have invented a new and useful Demountable Rim, of which the following is a specification.

This invention relates to vehicle wheels, and is more particularly directed to a demountable rim for use on automobile wheels.

Heretofore, various constructions of demountable rims have been made, wherein it was necessary to remove a number of complicated parts before it was possible to remove the tire, and generally the adjacent surfaces of the demountable rim and the fixed rim became so thoroughly interlocked that it was necessary to wedge them apart by instruments not ordinarily carried by the driver of an automobile.

An object of this invention is to provide a new and improved demountable rim which may be readily and easily applied when necessary to the fixed rim of an automobile wheel and which contains very few interlocking parts, so that expert knowledge and specially constructed tools will not be required for removing or replacing the tire.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Figure 1:
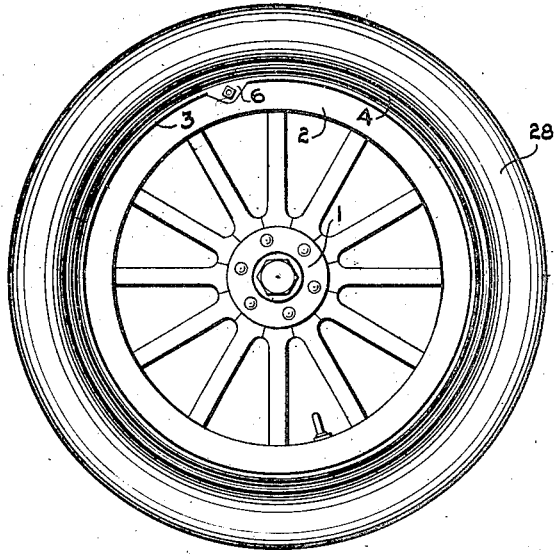
Fig. 1 is a side elevation of an automobile with my invention applied.

Referring to the drawing, 1 designates a wheel provided with a felly 2, upon which is adapted to be secured, in any suitable manner, a fixed rim 3, upon which is removably mounted a demountable rim 4.

The fixed rim 3 is provided with an inwardly-projecting lug 5 adapted to laterally engage an inwardly-projecting lug 6 on the demountable rim 4, the lug 6 projecting through a slot or opening 7 formed in the fixed rim 3. The lugs 5 and 6 are of such a width when placed adjacent each other as to be contained within the width of the demountable rim 4. These lugs are provided with alined perforations 8 and 9 through which is adapted to be inserted the bolt 10 for securing the lugs together.

Diametrically opposite the center of said lug are alined openings 11 and 12 perforating the rims 3 and 4, respectively, and adapted to receive the air valve of an inner tube.

Upon opposite sides of the openings 11 and 12 of the respective rims are spaced wedge-shaped members 13 and 14. The wedges 13 are formed on the outer periphery of the rim 3, while the wedges 14 are formed upon the inner periphery of the rim 4. The wedges 14, formed on the inner periphery of the rim 4, are placed near the openings 12 in the rim 4, while the wedges 13 formed on the outer periphery of the rim 3 are adapted to engage the rim 4 on opposite sides of the wedges 14 and to loosely engage the side edges of said wedges, to assist in preventing rotation of the demountable rim on the fixed rim and likewise to tighten the rims upon each other when they are in locking position.

Upon opposite sides of the lugs 5 and 6 of the respective rims are located complementary wedge-shaped members 15 and 16, respectively, which are adapted to slide directly upon and grip each other firmly to make a more secure fitting of the rims when the demountable rim is locked upon the fixed rim. All these wedges 13, 14, 15 and 16 may be cast integrally with the rims, or they may be made separately and of copper or some soft metal and be soldered or brazed on after the rims have been cast. By forming the wedges of such metal, noise will be prevented when the rims are not sufficiently tightened upon each other, and when the vehicle is in motion, since the hard metals are relieved from frictional engagement with each other. Other wedge-shaped members, such as 17, may be formed upon the remaining portion of the periphery of the fixed rim 3 to provide a more thorough fitting of the rims upon each other, and if the wedges 17 are likewise made of soft material, they will necessarily prevent noises and reduce the friction between those portions of the rims when the wedges have been applied.

Figure 2:
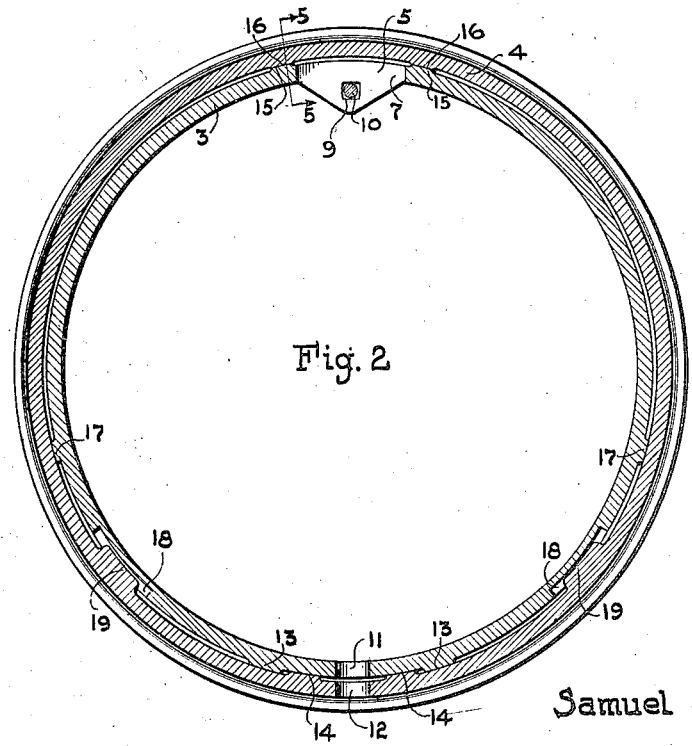
Fig. 2 is a vertical transverse section of the fixed rim and the demountable rim.
Figure 3:
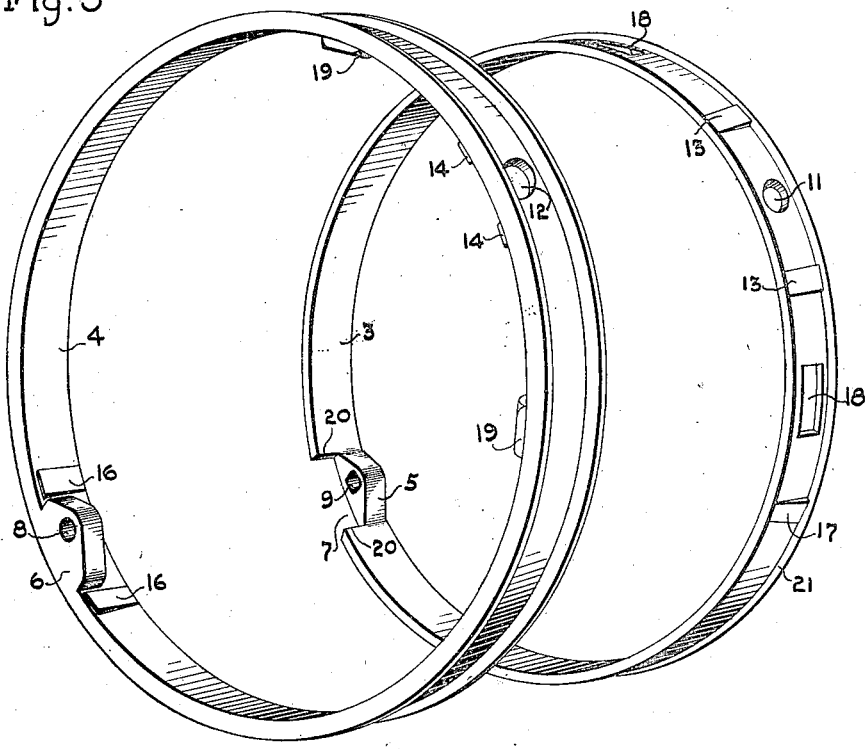
Fig. 3 is a view in perspective of the two rims.

Spaced upon opposite sides of the opening 11, in the fixed rim 3, are slots 18 into which are adapted to be inserted lugs or projections 19 formed upon the inner surface of the demountable rim 4. It will be noted from Fig. 2 that these lugs 19 fall somewhat short of the length of the slot, but neatly fit the width of the slot, the object of such a construction being to permit a slight rotational movement of the demountable rim when the rim is being mounted upon the fixed rim, but to prevent lateral movement of the rims when the rims are locked in position. The edges of the lugs 19 are made slightly round in order that the lugs may more readily be inserted into the slots 18.

Furthermore, it will be noted that the lug 6 fits snugly within the slot 7 of the rim 3 so that the side edges of the lugs 6 will abut the side edges 20 of the slot 7 and further aid in preventing rotational movement of the demountable rim when the said rim is in position.

Figure 5:
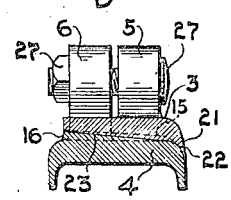
Fig. 5 is a section of the rim along the line 5—5 of Fig. 2, in the direction indicated by the arrow.

From an inspection of Fig. 5, the inner portion of the fixed rim 3 is provided with a knife edge flange 21 which is adapted to engage snugly the curved portion 22 of the demountable rim 4 so that a tight fitting of the rims is presented along this side of the wheel to prevent dirt or dust from working its way between the rims. The outer surface of the fixed rim is inclined at 23 outwardly from the flanged portion 21 to the annular edge of the rim.

Figure 4:
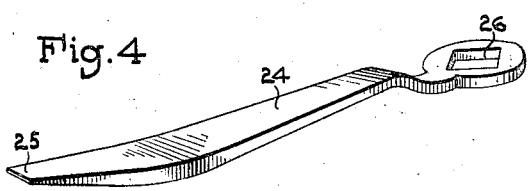
Fig. 4 is a perspective of the tool used in removing the demountable rim.

Fig. 4 discloses a tool 24 which will be helpful in removing the demountable rim, and is provided with a beveled edge portion 25 adapted to be inserted between the rims when forcing them apart, while the opposite end of the tool is provided with an opening 26 of such a configuration that it may neatly fit a nut 27 of the bolt 10 for turning the same in preparation of releasing or securing the lugs 5 and 6 together. In other words, the tool 24 is a combined wrench and tire removing tool.

The operation of my device is as follows:—The tire 28, with the necessary inner tube, is placed upon the demountable rim 4 and inflated with the valve stem of the inner tube projecting through the opening 12. The rims are brought together in such a manner that the valve stem will also project through the perforation 11 of the rim 3 and the lugs 19 of the demountable rim 4 will be positioned in the slots 18 of the fixed rim 3. Pressure may now be applied to the demountable rim 4 at and on opposite sides of the lug 6, when the demountable rim will readily slip in place upon the fixed rim 3, the lug 6 falling in juxtaposition with the lug 5. The bolt 10 is inserted through the alined perforations 8 and 9 of the lugs and the nut 27 is tightened by means of the tool 24.

The removal of the tire is effected by removing the nut 27 and the bolt 10, and applying the tool either between the lugs 5 and 6 to start the separation of the rims, or the beveled edge 26 of the tool may be applied directly between the rims to force the rims apart. As soon as the upper portion of the demountable rim is loosened, the rim may be removed by firmly pulling upon the portion of the demountable rim nearest the lug 6, when the lower portion of the rim will be readily pulled away from the fixed rim and the lugs 19 will be forced from their sockets 18.

What is claimed is:—

1. In a vehicle wheel, a demountable rim, a fixed rim, spaced openings in the fixed rim, spaced lugs depending from the inner face of the demountable rim and projecting through said openings, and lugs projecting inwardly from the rims and adapted to be secured together, one of the rims having a portion of its periphery cut away, the cut out portion receiving the lug of the other rim.

2. In a vehicle wheel, a demountable rim, a fixed rim, spaced sockets in said fixed rim, lugs on the demountable rim and projecting into the sockets, lugs projecting inwardly from the rim having their adjacent sides in abutment, means for securing the lugs together, and cooperating wedge-shaped members on the rims located on opposite sides of the secured lugs and in engagement with each other to bind the rims together at that point.

3. In a vehicle wheel, a demountable rim, a fixed rim, lugs projecting inwardly from the rims and adapted to be secured together, complementary means on the rims engaging each other and adapted to bind those portions of the demountable rim which are located on both sides of the inwardly projecting lugs to the fixed rim, and lugs projecting from the demountable rim and engaging slots in the fixed rim to prevent lateral movement of the rims.

4. In a vehicle wheel, a demountable rim, a fixed rim, lugs projecting inwardly from the rims and adapted to be secured together, the lug on the demountable rim projecting through an opening in the fixed rim, means on the rims adapted to prevent portions of the inner surface of the demountable rim and the outer surface of the fixed rim from frictionally engaging each other, and means on the demountable rim engaging complementary means on the fixed rim to prevent lateral movement of the rims.

5. In a vehicle wheel, a demountable rim, a fixed rim, lugs projecting inwardly from the rims and adapted to be secured together, said rim being provided with alined openings for the insertion of an air valve, means on the rims and located upon opposite sides of the openings for the air valve to prevent the demountable rim from rotating on the fixed rim, and complementary means spaced upon opposite sides of said openings in the rims and adapted to engage each other to prevent lateral movement of the demountable rim.

6. In a vehicle wheel, a demountable rim having a lug projecting inwardly from its inner face, said lug having one side face flush with one side of the rim and the other side face spaced from the other side of the rim, a fixed rim having a lug projecting inwardly from its inner face with one side face flush with the side of the rim, the rim being slotted for a distance equal to the length of the lug, which slot extends widthwise from the lug to the other side of the rim to form a socket for the reception of the lug of the demountable rim, the sides of the slot engaging the opposite ends of the lug on the demountable rim to prevent rotation of said rim, means for securing the lugs together and means coacting with said lugs to hold the rims against relative lateral displacement.

7. In a vehicle wheel, a demountable rim, a fixed rim, lugs projecting inwardly from the rims and adapted to be secured together, and means on the demountable rim adapted to loosely engage complementary means on the fixed rim to permit a slight rotation of the demountable rim on the fixed rim when said demountable rim is being placed in position on the fixed rim but to prevent lateral movement of the demountable rim on said fixed rim when positioned.

8. In a vehicle wheel, a demountable rim, a fixed rim, lugs projecting inwardly from the rims and adapted to be secured together, the face of the fixed rim being provided with spaced elongated openings, elongated projections on the inner face of the demountable rim having a length less than the length of the openings to permit a slight rotation of the demountable rim when being placed in position on the fixed rim, the projections being of a width to snugly fit the openings whereby lateral movement of the rims is prevented when said rims are in position.

In testimony, that I claim the foregoing as my own, I have hereto affixed my signature.

SAMUEL S. DAVIS.